US010036647B2

(12) United States Patent
Barraci et al.

(10) Patent No.: US 10,036,647 B2
(45) Date of Patent: Jul. 31, 2018

(54) SYSTEMS AND METHODS FOR THE DETERMINATION OF A USER'S 4D TRAJECTORY (71) Applicant: The Boeing Company, Chicago, IL (US)

(72) Inventors: Nima Barraci, Moerfelder Landstrasse (DE); Andreas Sindlinger, Wintergrasse (DE)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/556,741

(22) Filed: Dec. 1, 2014

(65) Prior Publication Data
US 2016/0153798 A1 Jun. 2, 2016

(51) Int. Cl.
G01C 21/36 (2006.01)
G01S 19/39 (2010.01)
G06F 17/30 (2006.01)
G06Q 10/04 (2012.01)
G06Q 10/10 (2012.01)
G06Q 50/00 (2012.01)

(52) U.S. Cl.
CPC .............. *G01C 21/36* (2013.01); *G01S 19/39* (2013.01); *G06F 17/30241* (2013.01); *G06F 17/30864* (2013.01); *G06Q 10/047* (2013.01); *G06Q 10/109* (2013.01); *G06Q 50/01* (2013.01)

(58) Field of Classification Search
CPC ............. G06Q 10/109; G06Q 10/1093; G06Q 10/1095; G01C 21/362
See application file for complete search history.

(56) References Cited

U.S. PATENT DOCUMENTS

2008/0167937 A1* 7/2008 Coughlin ............... G01C 21/20 705/7.16
2012/0136572 A1* 5/2012 Norton ............... G01C 21/3407 701/465
2013/0315042 A1 11/2013 Kindel
2014/0278057 A1 9/2014 Berns

OTHER PUBLICATIONS

Facebook, events; http://www.facebook.com/help/131325477007622/; dated Dec. 1, 2014.

(Continued)

*Primary Examiner* — Michael D Lang
(74) *Attorney, Agent, or Firm* — Patterson + Sheridan, LLP (57) ABSTRACT A system and method for maintaining a user's four dimensional (4D) trajectory is disclosed. The system can comprise a plurality of databases related to the user's personal preferences, historical actions, and travel data, among other things. The system can receive requests for appointments, or trajectory information requirements (TIRs), via a user interface, by e-mail, text message, or by other communication means. The TIR can include a date, location, time, and duration. The system can compare the TIR to the locations and timespans of adjacent calendar events to determine if the TIR conflicts with adjacent event. If the TIR does not conflict, the system can add the TIR to the user's overall 4D trajectory. If, on the other hand, the TIR does conflict, the system can delete the TIR and/or send a cancellation message via the user interface.

20 Claims, 7 Drawing Sheets (56) References Cited

OTHER PUBLICATIONS

Google, events; http://www.google.com/intl/de/+/learnmore/events/; dated Dec. 1, 2014.
Apple location based reminders; https://support.apple.com/kb/HT4970; dated Dec. 1, 2014.
European Search Report for EP 15187441, dated Apr. 13, 2016.

* cited by examiner

SYSTEMS AND METHODS FOR THE DETERMINATION OF A USER'S 4D TRAJECTORY

FIELD

Embodiments of the present disclosure relate generally to location services and specifically to systems and methods for predicting a user's location by time based on the incorporation and analysis of multiple data sources.

BACKGROUND

Modern systems can provide location and tracking services using a variety of technologies. Cell phones, for example, now can have both GPS and cellular location services. Users location can sometimes also be provided in almost real time by social media sites, such as Facebook, when user's "check-in" or use other location features. In addition, personal calendar applications, such as the calendar function in Microsoft Outlook or in Apple's iOS, can also provide information related to the time and locations of meetings and other calendar items.

Due to the sheer amount of data and the variety of sources, however, it can be difficult to know with any certainty when a user is available, for example, or whether they could attend a meeting at a certain time in a certain place. Using just a user's calendar in Outlook®, for example, it may appear as though the user has a meeting at 10AM, but is available for a meeting in New York at 11 AM. This is obviously not possible, however, if the 10AM meeting is in San Francisco. In other words, without accurate data about the user's schedule and location, their availability can be difficult to determine.

Conventional systems tend to be three-dimensional (3D) in nature. In other words, you may be able to ask your phone to remind you to get flowers when you are next near a florist. This relies on chance, however, as does not consider whether, for example, you have time to get flowers at that time. Thus, conventional systems rely solely on the user's 3D location, and have no temporal component. As a result, conventional 3D systems are reactive, as opposed to predictive, and thus have no ability to predict when you will be near a florist and it would be convenient based on your schedule.

What is needed, therefore, is a system and method that can combine the information available for a user from multiple sources to create an accurate model of the user's location in time. The system can include a reliability, or accuracy, component to indicate the probability that the user's calculated 4D location is accurate at any given time. It is to such a system and method that embodiments of the present disclosure are primarily directed.

SUMMARY

It should be appreciated that this Summary is provided to introduce a selection of concepts in a simplified form that are further described below in the Detailed Description. This Summary is not intended to be used to limit the scope of the claimed subject matter.

Embodiments of the present disclosure can include systems and methods for providing a user's four dimensional (4D) location. The system can pull data from multiple sources to create a 4D trajectory for the user including at least a location and a temporal component.

Embodiments of the present disclosure can comprise a method for generating a user's overall four-dimensional (4D) trajectory. In some embodiments, the method can comprise receiving a trajectory information requirement (TIR) via one or more applications via an interface and determining a timespan for the TIR with a processor. The method can continue by retrieving one or more adjacent events to the TIR from a calendar database, retrieving a first location for the first adjacent event from a map database, calculating one or more travel routes between the TIR and the first location with the processor based on data from one or more travel databases, and comparing the one or more travel routes with one or more history databases to calculate a first probable travel route with the processor.

The method can determine whether the TIR conflicts with the first adjacent event with the processor. If there is no conflict, the first 4D trajectory section can be saved to a trajectory database containing the user's overall 4D trajectory. In some embodiments, the TIR can comprise at least a location, a date, a start time, and a duration.

Embodiments of the present disclosure can also comprise a non-transitory computer readable medium containing program instructions for causing a computer to perform the method of receiving a trajectory information requirement (TIR) from one or more applications via an interface, determining a timespan for the TIR with a processor, retrieving one or more events adjacent to the TIR from a calendar database, pairing a first adjacent event from the one or more adjacent events with the TIR with the processor, retrieving a first location for the first adjacent event from a map database, calculating one or more travel routes between the TIR and the first location with the processor based on data from one or more travel databases, comparing the one or more travel routes with one or more history databases to calculate a first probable travel route with the processor, creating a first 4D trajectory section including the first adjacent event and the TIR, and determining whether the TIR conflicts with the first adjacent event with the processor. If the TIR does not conflict, the method can also save the first 4D trajectory section to a trajectory database containing the user's overall 4D trajectory. If the TIR does conflict, it can be deleted. As before, the TIR can comprises at least a location, a date, a start time, and a duration.

Embodiments of the present disclosure can also comprise a system for maintaining a user's overall 4D trajectory. In some embodiments, the system can comprise an interface for receiving input from one or more inputs and providing one or more outputs, the one or more inputs comprising at least a trajectory information requirement (TIR) from one or more applications, a location system for providing at least the user's current location, a transportation history database comprising one or more datasets regarding the user's transportation history, a user history database comprising one or more datasets regarding the user's personal information, and a transportation database comprising one or more datasets regarding one or more modes of transportation, a calendar database comprising at least the user's current overall 4D trajectory.

The system can also comprise a processor for receiving a TIR from the one or more applications and comparing the TIR to one or more adjacent calendar events, calculating a first probable travel route based on the user's transportation history, determining whether the TIR conflicts with one or more of the adjacent calendar events, and adding the TIR to the user's overall 4D trajectory if the TIR does not conflict with the one or more adjacent calendar events.

The features, functions, and advantages that have been discussed can be achieved independently in various embodiments of the present disclosure or may be combined in yet other embodiments, further details of which can be seen with reference to the following description and drawings.

Each figure shown in this disclosure shows a variation of an aspect of the embodiment presented, and only differences will be discussed in detail.

DETAILED DESCRIPTION

Embodiments of the present disclosure relate to systems and methods for the determination of a user's personal 4D trajectory (e.g., their location in space and time). The system can utilize multiple information sources such as, for example and not limitation, the user's calendar, GPS tracking, map information, information related to the user's transportation habits, information from public transportation databases, and information from social media networks. The system can employ a multi-stage approach in which the user's personal 4D trajectory and the accuracy thereof are generated depending on the use case.

To simplify and clarify explanation, the disclosure is described herein as systems and methods for generating a person's 4D trajectory. One skilled in the art will recognize, however, that the disclosure is not so limited. The system can be used, for example and not limitation, with tour groups, teams, and other groups of people, with minor modification. The disclosure could also be used to improve the services provided by other applications, such as providing customized recommendations for restaurants and other services based on the user's trajectory.

The algorithms and methods described hereinafter as making up the various elements of the present disclosure are intended to be illustrative and not restrictive. Many suitable procedures and systems that would perform the same or a similar function as the methods described herein are intended to be embraced within the scope of the disclosure.

As mentioned above, a problem with conventional scheduling and location software is that is does not combine the time and location components of a user's schedule. So, for example, while a user may show availability in their calendar for a particular meeting, this does not take into account the user's location prior to the meeting. So, for example, the user's location and travel time is not taken into account. In addition, while many applications can provide localized information to users (e.g., local restaurants), they generally do so only in real time. In other words, they can find restaurants in your current location, but do not, for example, take into account where you will be for dinner.

Figure 1A:
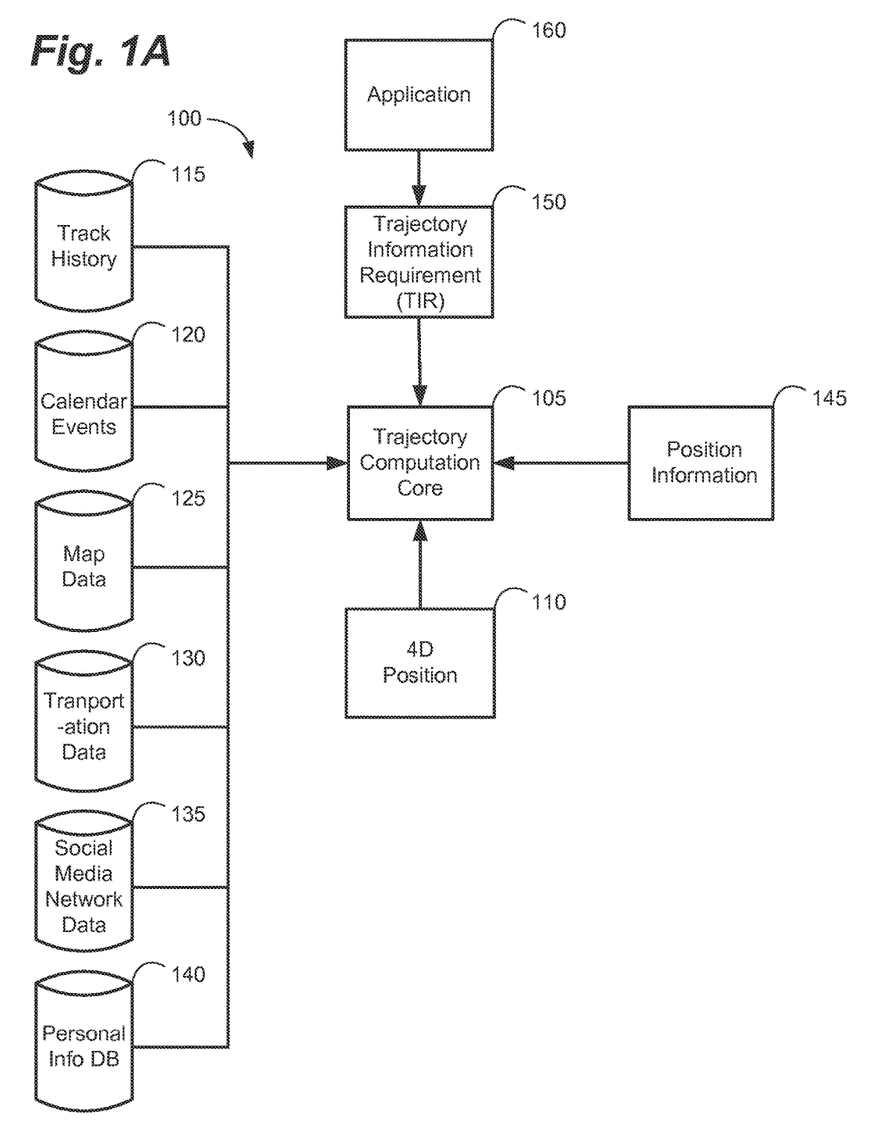
FIG. 1A depicts a 4D trajectory computation system, in accordance with some embodiments of the present disclosure.

To this end, embodiments of the present disclosure can comprise systems and methods for aggregating information from multiple sources to create a 4D (location and time) trajectory for users to enable, for example, more efficient scheduling and more relevant recommendations. The system 100 can comprise a computer program, an application for a mobile phone, or a cloud based application, among other things. In some embodiments, as shown in FIG. 1, the system 100 can comprise a trajectory computation core 105. The trajectory core 105 can comprise, for example and not limitation, a CPU, application specific integrated circuit (ASIC), and a field-programmable gate array (FPGA). In some embodiments, the system 100 can utilize the processor on a cell phone, tablet, laptop, or other computing device.

The trajectory core 105 can receive a plurality of inputs and then can provide a 4D position 110 output. In some embodiments, the trajectory core 105 can receive data from historical data, or track data, 115. This can include, for example, historical tracking data that can establish a daily routine, if applicable, or various user preferences. If, for example, the user goes to work in the same location five days a week from approximately 9 AM to 5 PM, then the system 100 can predict, with fairly high accuracy where the user will be next Monday at 8:45 AM (commuting) and at LOAM (at work).

The historical data 115 can also include, for example and not limitation, past travel preferences, hotel preferences, and food preferences. If, for example, a user has made 10 trips from Munich to Dusseldorf and the user has flown five times and driven five times, the system 100 will assign a 50% probability that the user will take either mode of transportation. If, on the other hand, the user has driven nine out of the last ten times, the system 100 can assign a 90% accuracy that the user will drive. If the user takes a particular mode of transportation more than 50% of the time, in some embodiments, this mode of transportation can be considered a predominant mode of transportation. Of course, in some embodiments, the system may assign a higher value to this determination (e.g., 60%, 70%, 80%, or 90%).

Of course, people travel for business and pleasure, go out of the office for meetings, go on vacation, etc. To address this issue, the system 100 can also import data from one or more of the user's calendars 120. Calendar events 120 can be imported to the trajectory core 105, for example, from the user's Microsoft Outlook calendar, smart phone calendar, Google Calendar, or other sources. This can enable the system 100 to account for variations in the user's schedule due to meetings, vacation, lunch dates, etc. When available, the system 100 can also retrieve location data from the calendar entries (e.g., calendars that contain addresses). The system 100 can also receive input from an application 160, such as a request from a travel scheduling application or cell phone application. In some embodiments, the application 160 can comprise input directly from a user interface 160, such as a touchscreen for a mobile device or tablet, a keyboard, an e-mail or text, or a network based request. In some embodiments, the application 160 can be a travel agency scheduling program, a scheduling, calendar, or travel application on a user's cell phone, or a calendaring program (e.g., Outlook®).

In some embodiments, the system 100 can also correlate certain calendar entries with historical data. So, for example, if a user has a dentist appointment, and the last three times the user has used the same dentist, the system 100 can assign a relatively high accuracy that the user will be at that dentist for that appointment. In addition, if historical data is available for how the user generally travels to the dentist, the system 100 can also accurately provide the user's location when in transit to the dentist.

Similarly, the system 100 can also utilize map data 125. If a user has a meeting on Thursday in New York and on Friday in San Francisco, for example, based on the distance between these locations in the map data, the system 100 can assign a high probability (close to 100%) that the user will be flying from New York to San Francisco at some point between the two meetings. The system 100 can then refer to transportation data 130, for example, to locate possible flights.

In addition, the system 100 can include transportation data 130. This can include, for example, travel itineraries from the user's e-mail, text, or calendar. The transportation data 130 can comprise the travel dates, mode of travel, distance, estimated time of travel, and destination, among other things. The transportation data 130 can also comprise, for example, bus, flight and train schedules, travel times, traffic data, and other information. This can enable the system 100 to know, for example, that the user is not available for the above-mentioned meeting in New York because he is in San Francisco. The system 100 can determine, however, that the user may be available for a conference call or video conference, however, via the plane's internet connection, for example.

The system 100 can also combine travel data with historical data. If the user takes the same bus to work every day, for example, then his location during his commute can be provided with relatively high accuracy. If, based on historical data 115 and transportation data 130, the user never takes public transportation, on the other hand, then the system 100 can assign high accuracy to the fact that, when the user needs to travel within a predetermined first radius (e.g., 50 miles), that the user will almost certainly travel by car. Similarly, when the user travels outside a predetermined second radius (e.g., 200 miles), the system 100 can assign a high probability that the user will fly. In some embodiments, the system 100 can group travel preferences into, for example short, medium, and long distance travel groups, with a preferred, or predominant, mode of travel for each distance (long, medium, and short).

In some embodiments, the system can also gather data from social networking sites 135 such as Facebook and Twitter. If the user "checks-in" on Facebook, for example, from an event or receives an invite, the location and event details can be downloaded from Facebook. Similarly, Twitter provides an "add a location to my tweets" feature that can include location information. This information can be used alone and/or can be correlated with information from the user's calendar, for example, to establish start and end times for the event, location, and other relevant data.

In still other embodiments, the system 100 can also comprise a personal information database 140. The personal information database 140 can comprise, for example, the user's home and work addresses, contacts, and vendor preferences. The contacts in the personal information database 140 can include, for example, business and personal contacts. This can enable the system 100 to correlate a relatively non-specific calendar entry (e.g., "Doctor's Appointment") with a contact, for example, to increase accuracy.

In some embodiments, the system 100 can also receive position information 145 from the user, a GPS, or integrated positioning system. In some embodiments, this can include positional information 145 from the user's cell phone, including the cell phone's GPS receiver (if applicable) or location information provided by the cell phone's cellular location services (e.g., location approximation based on proximity to cell towers such as radio resource location services protocol (RRLP)). In still other embodiments, positional information 145 can be derived from, for example and not limitation, internet service providers (ISPs), vehicle and/or handheld GPS systems, and vehicle transponders (e.g., GM's OnStar system). In yet other embodiments, positional information 145 can be provided by real time travel data from airline, train, or other common carrier, alone or in combination with, for example calendar data. This can enable the system 100 to combine live route tracking from an airline's website, for example, with a flight listed in the user's calendar.

The trajectory core 105 can receive a trajectory information requirement (TIR) 150 from, for example, the user, the user's assistant, or a travel agent. In some embodiments, the TIR 150 can be received via a user interface including, for example and not limitation, a touchscreen on a user's phone, keyboard, e-mail, Outlook® calendar request, or text message. The TIR 150 can comprise, for example, a requested location and a time. So, for example, if the user is attempting to schedule a meeting in New York for LOAM on a Monday, the system 100 can use this data as a "look-up." If, for example, the user will be on a flight at LOAM Monday, the system 100 can calculate the user's 4D position 110, which in this case will be somewhere between the departure city and the arrival city on the plane (and can be supplemented by the aforementioned live tracking data), and either approve the meeting or deny the meeting. In some embodiments, the system 100 can also provide the user's 4D location—e.g., "I'm sorry, but the user is not available at that time. He/she will be in the air over Bielefeld on the way from Cologne to Hamburg at that time."

Figure 1B:
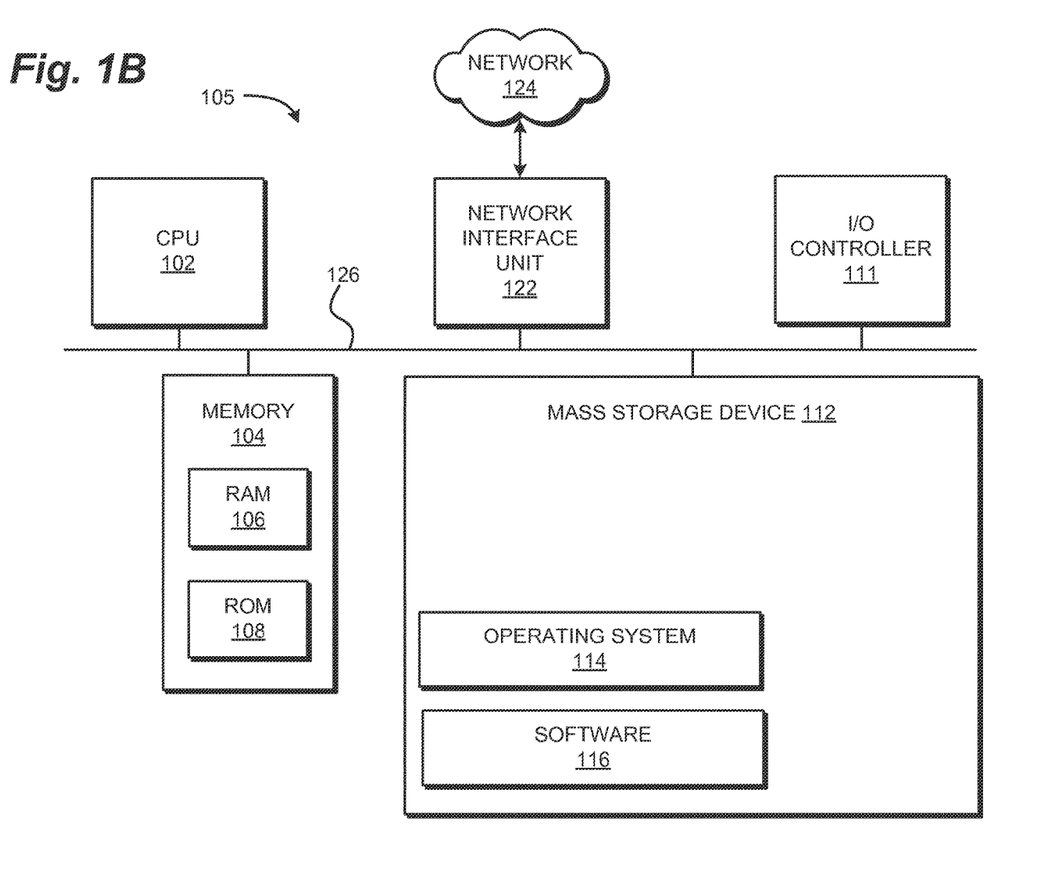
FIG. 1B depicts an exemplary computing device for executing a 4D trajectory computation system, in accordance with some embodiments of the present disclosure.

FIG. 1B illustrates an exemplary trajectory computation core 105. Thus, the trajectory computation core 105 illustrated in FIG. 1B illustrates an architecture for a mobile device processor, a server computer, a desktop computer, a netbook computer, a tablet, and/or a laptop computer. The trajectory computation core 105 may be utilized to execute any aspects of the software components presented herein.

The trajectory computation core 105 illustrated in FIG. 1B can comprise a central processing unit 102 ("CPU"), a system memory 104, including a random access memory 106 ("RAM") and a read-only memory ("ROM") 108, and a system bus 126 that couples the memory 104 to the CPU 102. A basic input/output system containing the basic routines that help to transfer information between elements within the trajectory computation core 105, such as during startup, is stored in the ROM 108. The trajectory computation core 105 can further include a mass storage device 112 for storing one or more operating systems 114 and/or software 116 for execution by the trajectory computation core 105 to perform the methods discussed below. Although not shown in FIG. 1B, the mass storage device 112 also can be configured to store data related to one or more of the databases (e.g., calendar events 120 and map data 125).

In some embodiments, the mass storage device 112 can be connected to the CPU 102 through a mass storage controller connected to the bus 126. The mass storage device 112 and its associated computer-readable media can provide volatile and non-volatile storage for the trajectory computation core 105. Although the description of computer-readable media contained herein refers to a mass storage device, such as a hard disk or CD-ROM drive, it should be appreciated by those skilled in the art that computer-readable media can be any available computer storage media or communication media that can be accessed by the trajectory computation core 105.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media can include volatile, non-volatile, removable, and non-removable media implemented in many methods or technologies for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the trajectory computation core 105. For purposes the claims, the phrase "computer storage medium" and variations thereof, does not include waves, signals, and/or other transitory and/or intangible communication media, per se.

According to various embodiments, the trajectory computation core 105 may operate in a networked environment using logical connections to remote computers through a network 124 such as a LAN, WLAN, intranet, or internet connection. The trajectory computation core 105 can connect to the network 124 through a network interface unit 122 connected to the bus 126. It should be appreciated that the network interface unit 122, which may be utilized to connect to other types of networks and remote computer systems such as, for example, the mass storage device 112. The trajectory computation core 105 can also include an input/output controller 111 for receiving and processing input from a number of other devices, including a keyboard, mouse, or electronic stylus. Similarly, the input/output controller 111 can provide output to a display screen, a printer, or other type of output device.

In some embodiments, the software components described herein may, when loaded into the CPU 102 and executed, transform the CPU 102 and the overall trajectory computation core 105 from a general-purpose computing system into a special-purpose computing system customized to facilitate the functionality presented herein. The CPU 102 may be constructed from any number of transistors or other discrete circuit elements, which may individually or collectively assume any number of states. More specifically, the CPU 102 may operate as a finite-state machine, in response to executable instructions contained within the software modules disclosed herein. These computer-executable instructions may transform the CPU 102 by specifying how the CPU 102 transitions between states, thereby transforming the transistors or other discrete hardware elements constituting the CPU 102.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. If the computer-readable media is implemented as semiconductor-based memory, for example, the software disclosed herein may be encoded on the computer-readable media by transforming the physical state of the semiconductor memory. The software may also transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the trajectory computation core 105 in order to store and execute the software components presented herein. It also should be appreciated that the trajectory computation core 105 may include other types of computing devices, including handheld computers, embedded computer systems, cell phones, personal digital assistants, and other types of computing devices known to those skilled in the art. It is also contemplated that the trajectory computation core 105 may not include all of the components shown in FIG. 1B, may include other components that are not explicitly shown in FIG. 1B, or may utilize an architecture completely different than that shown in FIG. 1B.

Figure 2:
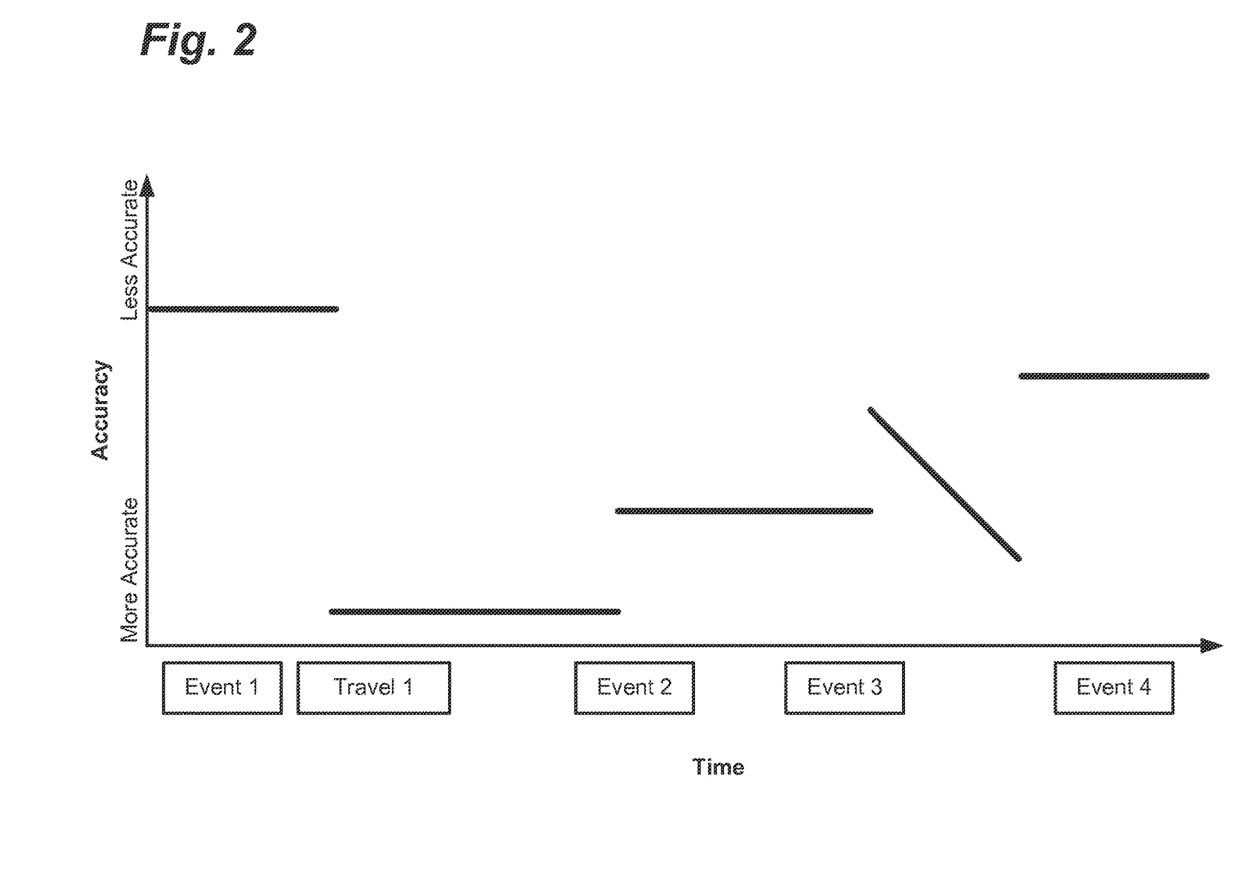
FIG. 2 is a graphical depiction representing the accuracy of a user's location, in accordance with some embodiments of the present disclosure.

In some embodiments, the system 100 can also provide information regarding the relative accuracy of the user's 4D position. In other words, how accurately the user's position can be provided as opposed to the probability that their location is known in general. As shown in FIG. 2, in some embodiments, this can be represented graphically with lines during a predetermined time period. So, for example, Event 1 may be a meeting at a convention. As a result, the accuracy of the user's 4D location during the meeting is somewhat vague. In other words, while the user has a high probability of being at Event 1, the user can be anywhere inside a 100,000 square-foot convention center.

In contrast, the user's location can be very accurately provided if, as shown at Travel 1, if the user is traveling by airplane. Using the aforementioned live tracking, therefore, the location of the plane can be provided which, in turn, provides the users position with considerable accuracy. Even further accuracy may be possible if the user is attending a convention at a convention center, but is giving a speech in a particular room of the convention center at a particular time. In some embodiments, as shown for Event 3, the user may move from a general session to a break-out session at the convention, increasing the accuracy of his location from the convention center generally to the specific meeting room for the break-out session, as shown by the downward sloping line moving from less to more accurate location.

Embodiments of the present disclosure can also comprise a method 300 for determining if a TIR 150 can be met. As mentioned above, a TIR 150 can comprise, for example and not limitation, a meeting request, a travel itinerary, or an appointment. The method 300 can start, therefore, by retrieving the data related to the TIR 150, as shown at 305 of FIG. 3A. This can include, at minimum, the timespan (including time zone) and location of the request. In some embodiments, the TIR 150 can also include additional relevant information such as number of attendees, equipment required, setup time, travel time, travel itineraries, meeting locations, etc.

Figure 3A:
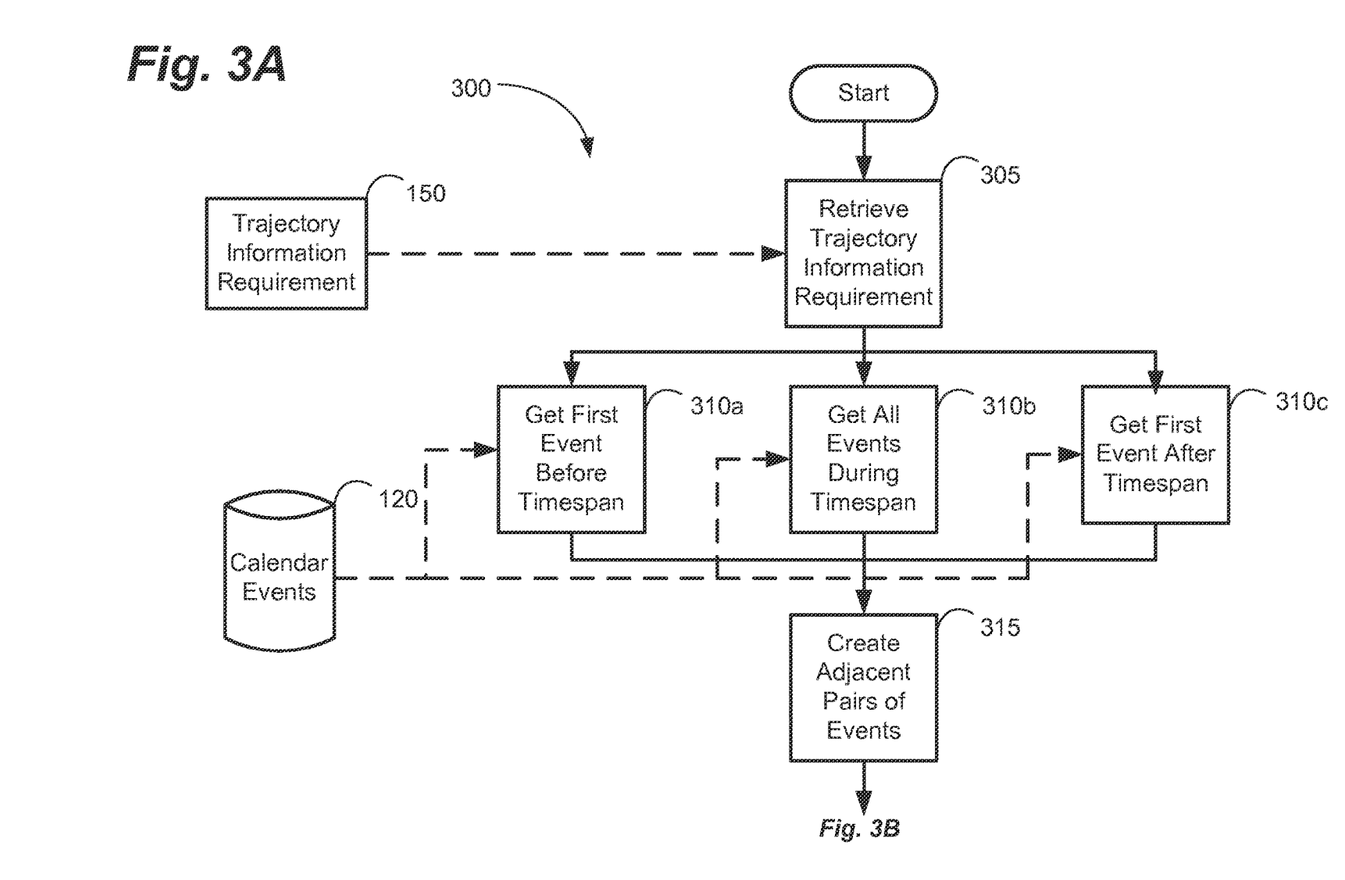
FIGS. 3A-3D contain a flowchart related to the building of a user's 4D trajectory; in accordance with some embodiments of the present disclosure.

Based on the timespan, the method 300 can then retrieve calendar events 120 in similar timespans as the TIR 150, as shown at 310. This can include calendar events 120 immediately preceding the TIR 150, as shown at 310a, events 120 during the timespan of the TIR 150, as shown at 310b, and events 120 immediately after the TIR 150, as shown at 310c. This can enable the method 300 to create a chronological map of the user's schedule around the TIR 150.

The method 300 can continue by creating pairs of adjacent events, as shown at 315. So, for example, if a user has a first meeting at 11 AM for one hour and a second meeting at 2 PM for half an hour, and the user receives a TIR 150 for a meeting at 12:30 PM for one hour, as shown at 305, the method can create pairs of adjacent or contiguous events. In this case, the first pair would be the first meeting and the new TIR 150 and the second pair would be the TIR 150 and the second meeting. In some embodiments, adjacent events can comprise events within a predetermined timeframe of the TIR 150. For local events, for example, adjacent events can comprise events that occur from two hours before the TIR 150 to two hours after the TIR. For out of town events, this timespan can be adjusted as appropriate.

Figure 3B:
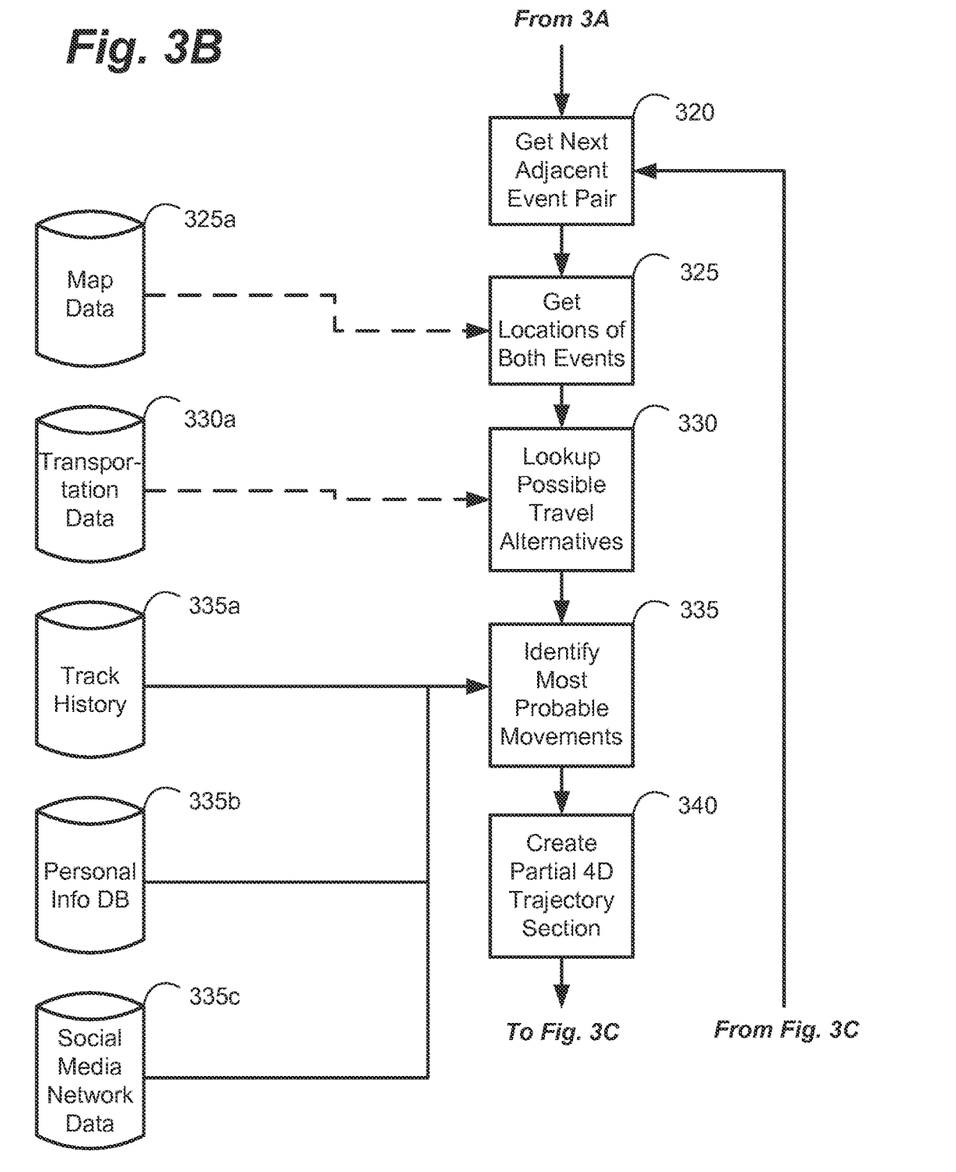

The method 300 can then select the next pair of events, which, in this case, would be the first pair (e.g., the first meeting and the TIR 150), as shown at 320 of FIG. 3B. The method 300 can continue by retrieving the locations for both events, as shown at 325. This information can be retrieved from map data 325a, for example, or may be included in historical 335a or personal data 335b. The method 300 can use the map data 325a to determine the TIR 150 conflicts with the first meeting. In other words, if it is feasible (or even possible), for example, to travel from one meeting to another. Obviously, if the meetings are in the same meeting room, or even the same building perhaps, the meeting can be essentially back-to-back. If, on the other hand, the meetings are in different locations, it may be necessary to determine what travel alternatives are available, as shown at 330. This can be determined from transportation data 330a, for example, which can include flight, driving, train or walking travel duration, travel times, and location data for airports, train stations, taxi stands, rental car agencies, etc.

The method 300 can continue by calculating the user's most likely movement, as shown at 335. As mentioned above, the system can use information related to the user's track history 335a, information from the user's personal database 335b, and even information from the user's social media accounts 335c. So, for example, if the user has to go to a meeting across town and he (1) rarely uses public transportation (from personal database 335b or Facebook 335c) and (2) he does not own a car (from personal database 335b), the method 300 can determine that the user will likely take a cab to the meeting. If the user takes a cab when he has cross town meetings 90% of the time, this level of probability can be included in the identification of probable movements 335.

The method 300 can then assemble the first portion of the user's 4D trajectory to create a partial 4D trajectory, or trajectory section, as shown at 340. In the example above, the section of the user's 4D trajectory would now be: First Meeting (11 AM-1 Hour)→Commute by cab (12:05 PM-0.33 Hour)→Trajectory Requirement (12:30 PM-1 hour). If, as in this case, the trajectory requirement 305 does not conflict with the first meeting (e.g., is determined to be possible/feasible), as shown at 345 of FIG. 3C, the method 300 can continue.

Figure 3C:
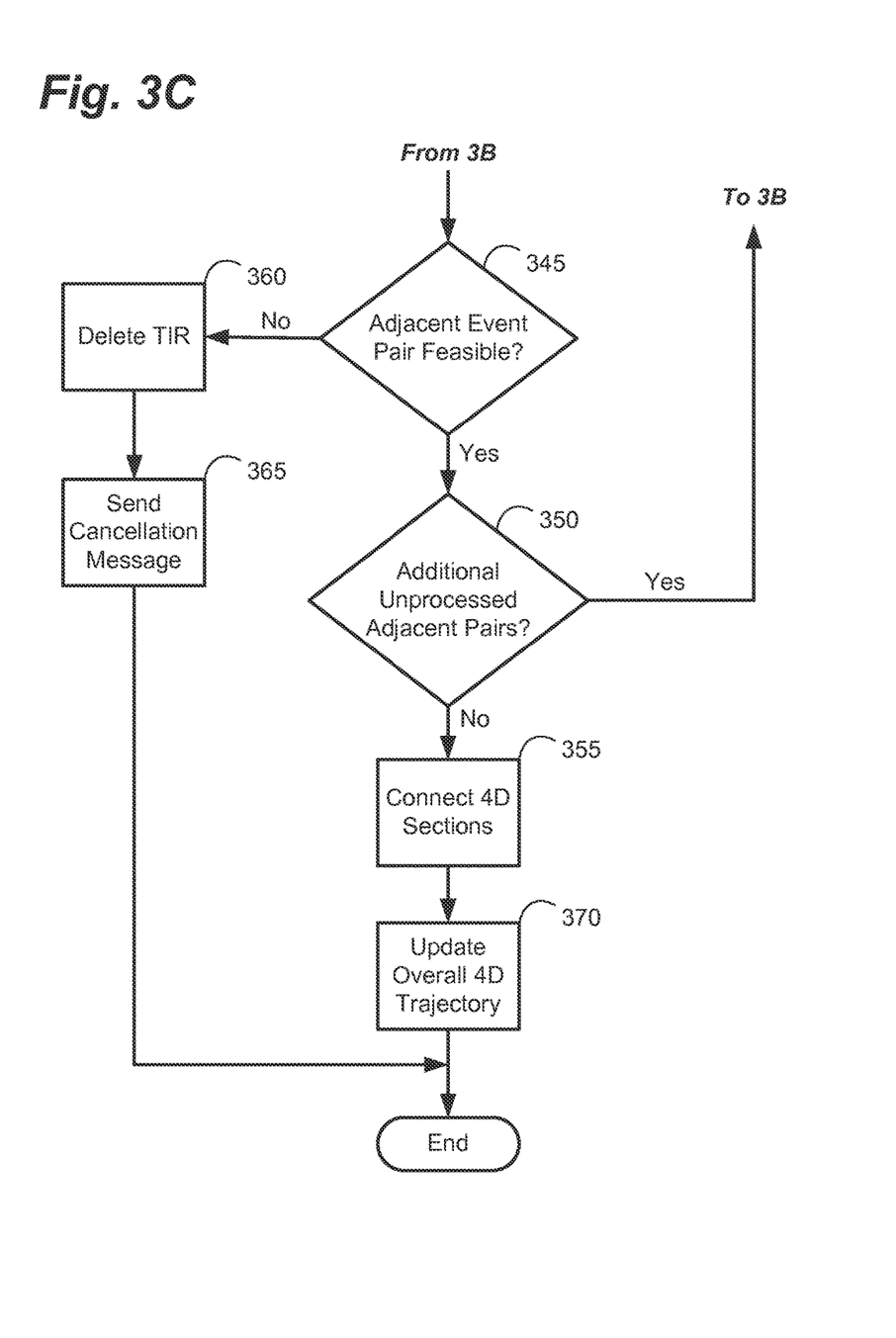

Of course, the determination of feasibility, as shown at 345, can depend on many factors. In some embodiments, the user can select a number of parameters with respect to feasibility. In other words, the user can tell the system that meetings, even in the same building, should never be scheduled with less than a 15 minute gap between meetings. Or that, anytime the meetings require travel in the medium or long distance group, then they should not be sooner than two hours after the predicted arrival time. The system can also use the user's assembled overall 4D trajectory including travel times and modes (e.g., cab to airport→flight→cab from airport), to determine the user's likely arrival time at the meeting or event to determine its feasibility. In some embodiments the system can prompt the user to approve a meeting within certain constraints and/or automatically schedule appointments outside such restraints (e.g., when there is "plenty of time" in the schedule).

If, as here, the event pair does not conflict, the method 300 can continue by determining if there are additional adjacent event pairs to be processed, as shown at 350. If there are additional pairs, the method 300 can return to retrieve the next pair of events, as shown at 320, and repeat the above-mentioned steps. In this case, the method 300 would continue with the TIR 150 and the second meeting. If, on the other hand, there are no additional adjacent event pairs, and no conflicts (e.g., infeasibilities) have been discovered, the method 300 can continue by connecting, or assembling, all of the partial 4D trajectory sections (from 340), as shown at 355. The method 300 can then approve the new TIR 150 and update the user's 4D trajectory, as shown at 310, to include the TIR 150.

Figure 3D:
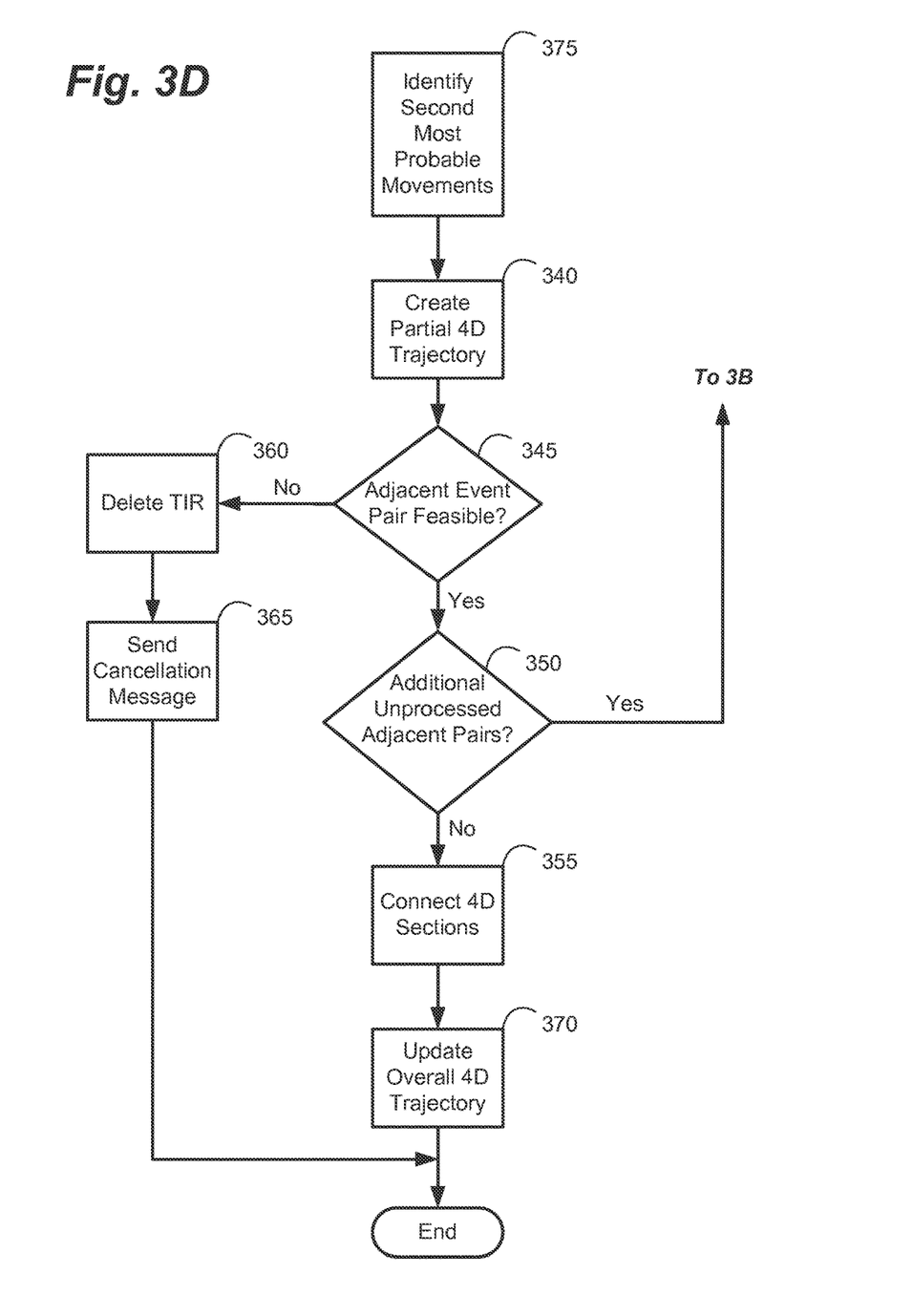

As shown in FIG. 3D, if the trajectory requirement 305 is determined to conflict (e.g. is determined to be impossible/infeasible), in some embodiments, the method 300 can include determining if an alternate mode of transportation or location, for example, will resolve the issue, as shown at 315. If, for example, the user prefers to take the train, but the transit time on the train makes a meeting infeasible, the method 300 can continue by determining a second mode of transportation (e.g., flight) to determine if the TIR 150 can be scheduled. If the change resolves the issue, the method 300 can approved the TIR and update the user's 4D trajectory, as shown at 310. If the conflict cannot be resolved, as before, the method 300 can comprise deleting the TIR 150, as shown at 360. And as before, if desired, the method 300 can also include sending a cancellation message to the requestor, as shown at 365.

While several possible embodiments are disclosed above, embodiments of the present disclosure are not so limited. For instance, while several possible databases, programs, and travel modes have been disclosed, other variations could be selected without departing from the spirit of the disclosure. In addition, the system is discloses above for use with a user's computer, cell phone, or other device, but could be implemented in a cloud based application. In addition, while discussed above as a "method," embodiments of the present disclosure can be implemented in a software application for execution on a suitable processor. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed embodiments, therefore, are considered in all respects to be illustrative and not restrictive. The scope of the disclosure is indicated by the appended claims, rather than the foregoing description, and all changes that come within the meaning and range of equivalents thereof are intended to be embraced therein.

The invention claimed is:

1. A computer-implemented method to maintain an overall four-dimensional (4D) trajectory for a user, the computer-implemented method comprising:
   subsequent to receiving a trajectory information requirement (TIR) for the user via one or more applications via an interface, the TIR specifying a location, a date, a start time, and a duration, determining a timespan for the TIR;
   retrieving, from a calendar database and based on the determined timespan, one or more adjacent events to the TIR that are associated with the user, the one or more adjacent events having no conflict with the TIR when locations are disregarded, wherein a first location for a first adjacent event of the one or more adjacent events is retrieved from a map database, the first location being geographically distinct from the specified location;
   calculating, by one or more computer processors and based on data from one or more travel databases, a plurality of potential travel routes between the specified location and the first location;
   determining, from a plurality of transportation modes used in a plurality of completed travel routes included in a transportation history of the user, a primary transportation mode of the user that is specific to traveling between the specified location and the first location;
   comparing the plurality of potential travel routes with one or more history databases to calculate a first probable travel route of the plurality of potential travel routes, wherein calculating the first probable travel route comprises identifying one potential travel route of the plurality of potential travel routes that uses the primary transportation mode of the user; and
   subsequent to identifying an actual conflict between the TIR and the first adjacent event when the first probable travel route is adopted to travel between the specified location and the first location, automatically denying the TIR, in which case the overall 4D trajectory is not updated to include the TIR.

2. The computer-implemented method of claim 1, wherein the actual conflict between the TIR and the first adjacent event is identified in a first instance, wherein the computer-implemented method further comprises, in a second instance:
   identifying no actual conflict between the TIR and the first adjacent event;
   retrieving, from the map database, a second location for a second adjacent event;
   calculating, based on data from the one or more travel databases, a second plurality of potential travel routes between the specified location and the second location;
   comparing the second plurality of potential travel routes with the one or more history databases to calculate a second probable travel route of the second plurality of potential travel routes; and
   subsequent to identifying an actual conflict between the TIR and the second adjacent event when the second probable travel route is used to travel between the specified location and the second location, automatically denying the TIR, in which case the overall 4D trajectory is not updated to include the TIR.

3. The computer-implemented method of claim 1, wherein comparing the plurality of potential travel routes with the one or more history databases comprises comparing the plurality of potential travel routes with the user's transportation history, personal information, and social media history.

4. The computer-implemented method of claim 1, wherein calculating the plurality of potential travel routes comprises calculating one or more scheduled travel routes between the specified location and the first location with data from one or more of airline schedules, train schedules, and bus schedules.

5. The computer-implemented method of claim 1, wherein retrieving the one or more adjacent events comprises retrieving events with associated timespans from two hours before the TIR to two hours after the TIR.

6. The computer-implemented method of claim 1, wherein the transportation history further comprises travel preferences automatically inferred for the user and corresponding to a long distance travel group, a medium distance travel group, and a short distance travel group, respectively;
   wherein each of the long distance travel group, the medium distance travel group, and the short distance travel group corresponds to a respective determined transportation mode; and
   wherein determining the primary transportation mode of the user comprises determining whether the first probable travel route corresponds to the long distance travel group, the medium distance travel group, and the short distance travel group.

7. The computer-implemented method of claim 1, further comprising:
   receiving, from a first application of the one or more applications via the interface, a request for a future location of the user at a future time;
   locating the future time in a trajectory database containing the overall 4D trajectory; and
   upon determining that a future event of the overall 4D trajectory coincides with the future time, retrieving an event location for the future event from the map database and providing the event location to the first application.

8. The computer-implemented method of claim 1, wherein the TIR comprises a proposed 4D appointment, wherein the proposed 4D appointment is automatically denied in order to facilitate schedule management based on analyzing user-specific travel patterns between specific locations, wherein the overall 4D trajectory includes a plurality of accepted 4D appointments of the user, wherein automatically denying the proposed 4D appointment includes generating and outputting an indication that the proposed 4D appointment is denied as conflicting owing to the travel time needed, the indication specifying the first location, wherein the actual conflict between the proposed 4D appointment and the first adjacent event is identified in a first instance.

9. The computer-implemented method of claim 8, wherein the computer-implemented method further comprises, in a second instance:
   subsequent to identifying no actual conflict between the proposed 4D appointment and the first adjacent event, retrieving, from the map database, a second location for a second adjacent event;
   calculating, based on data from the one or more travel databases, a second plurality of potential travel routes between the specified location and the second location;
   comparing the second plurality of potential travel routes with the one or more history databases to calculate a second probable travel route of the second plurality of potential travel routes; and
   upon identifying an actual conflict between the proposed 4D appointment and the second adjacent event when the second probable travel route is used to travel between the specified location and the second location, automatically denying the proposed 4D appointment.

10. The computer-implemented method of claim 9, further comprising, in a third instance and upon determining that the first probable travel route creates the actual conflict between the proposed 4D appointment and the first adjacent event:
   comparing the plurality of potential travel routes with the one or more history databases to calculate a second probable travel route of the plurality of potential travel routes; and
   upon determining that the proposed 4D appointment does not conflict with the first adjacent event when using the second probable travel route is used to travel between the specified location and the second location, automatically accepting the proposed 4D appointment, including updating the 4D trajectory to include the proposed 4D appointment and generating and outputting an indication that the proposed 4D appointment is accepted.

11. The computer-implemented method of claim 10, wherein comparing the plurality of potential travel routes with the one or more history databases comprises comparing the plurality of potential travel routes with the user's transportation history, personal information, and social media history;
   wherein calculating the plurality of potential travel routes comprises calculating one or more scheduled travel routes between the specified location and the first location with data from airline schedules, train schedules, and bus schedules;
   wherein retrieving the one or more adjacent events comprises retrieving events with associated timespans from two hours before the proposed 4D appointment to two hours after the proposed 4D appointment.

12. The computer-implemented method of claim 11, wherein the transportation history further comprises travel preferences automatically inferred for the user and corresponding to a long distance travel group, a medium distance travel group, and a short distance travel group, respectively;
   wherein each of the long distance travel group, the medium distance travel group, and the short distance travel group corresponds to a respective determined transportation mode; and
   wherein determining the primary transportation mode of the user comprises determining whether the first probable travel route corresponds to the long distance travel group, the medium distance travel group, and the short distance travel group, respectively.

13. The computer-implemented method of claim 12, wherein the indication includes a current location of the user from a location system, wherein the location system includes a Global Positioning System (GPS) and a radio resource location services protocol (RRLP) system, wherein determining the primary transportation mode of the user comprises eliminating, based on retrieved personal information or retrieved social media information, at least one of the plurality of the transportation modes from being selected as the primary transportation mode, wherein the computer-implemented method further comprises:
   receiving, from a first application of the one or more applications via the interface, a request for a future location of the user at a future time;
   locating the future time in a trajectory database containing the 4D trajectory of the user; and
   upon determining that a future event of the 4D trajectory coincides with the future time, retrieving an event location for the future event from the map database and providing the event location to the first application.

14. A non-transitory computer-readable medium containing program instructions executable to perform an operation to maintain an overall four-dimensional (4D) trajectory for a user, the operation comprising:
   subsequent to receiving, from one or more applications via an interface, a trajectory information requirement (TIR) for the user, the TIR specifying a location, a date, a start time, and a duration, determining a timespan for the TIR;
   retrieving, from a calendar database and based on the determined timespan, one or more adjacent events to the TIR that are associated with the user, the one or more adjacent events having no conflict with the TIR when locations are disregarded, wherein a first location for the first adjacent event is retrieved from a map database, the first location being geographically distinct from the specified location;
   calculating, by operation of one or more computer processors when executing the program instructions and based on data from one or more travel databases, a plurality of potential travel routes between the specified location and the first location;
   determining, from a plurality of transportation modes used in a plurality of completed travel routes included in a transportation history of the user, a primary transportation mode of the user that is specific to traveling between the specified location and the first location;
   comparing the plurality of potential travel routes with one or more history databases to calculate a first probable travel route of the plurality of potential travel routes, wherein calculating the first probable travel route comprises identifying one potential travel route of the plurality of potential travel routes that uses the primary transportation mode of the user; and
   subsequent to identifying an actual conflict between the TIR and the first adjacent event when the first probable travel route is adopted to travel between the specified location and the first location, automatically denying the TIR, in which case the overall 4D trajectory is not updated to include the TIR.

15. The non-transitory computer readable medium of claim 14, wherein the actual conflict between the TIR and the first adjacent event is identified in a first instance, wherein the operation further comprises, in a second instance:
   identifying no actual conflict between the TIR and the first adjacent event;

retrieving, from the map database, a second location for the second adjacent event;

calculating, based from the one or more travel databases, a second plurality of potential travel routes between the specified location and the second location;

comparing the second plurality of potential travel routes with the one or more history databases to calculate a second probable travel route of the second plurality of potential travel routes; and subsequent to identifying an actual conflict between the TIR and the second adjacent event when the second probable travel route is used to travel between the specified location and the second location, automatically denying the TIR, in which case the overall 4D trajectory is not updated to include the TIR.

16. The non-transitory computer readable medium of claim 14, wherein the operation further comprises:

identifying the actual conflict between the TIR and the first adjacent event, providing a denial message via the interface.

17. The non-transitory computer readable medium of claim 14, wherein the operation further comprises:

receiving, via the interface, a request for a current location of the user;

retrieving, using the processor, the overall 4D trajectory of the user from a trajectory database;

locating, within the trajectory database, a first trajectory section corresponding to a current time;

calculating the current location of the user in the first trajectory section; and providing, via the interface, the current location of the user.

18. The non-transitory computer readable medium of claim 14, wherein the actual conflict between the TIR and the first adjacent event is identified in a first instance, wherein the operation further comprises, in a second instance and upon determining that the first probable travel route creates the actual conflict between the TIR and the first adjacent event:

comparing the plurality of potential travel routes with the one or more history databases to calculate a second probable travel route of the plurality of potential travel routes; and upon determining that the TIR does not conflict with the first adjacent event when the second probable travel route is used to travel between the specified location and the second location, automatically accepting the TIR, in which case the overall 4D trajectory is updated to include the TIR.

19. The non-transitory computer readable medium of claim 14, wherein the operation further comprises:

receiving, from a first application of the one or more applications via the interface, a request for a further location of the user at a future time;

locating the future time in a trajectory database containing the overall 4D trajectory of the user; and upon determining that a future event of the overall 4D trajectory coincides with the future time, retrieving an event location for the future event from the map database and providing the event location to the first application.

20. A system to maintain an overall four-dimensional (4D) trajectory for a user, the system comprising:

one or more computer processors;

a memory containing a program which, when executed by the one or more computer processors, performs an operation comprising:

subsequent to receiving a trajectory information requirement (TIR) for the user via one or more applications via an interface, the TIR specifying a location, a date, a start time, and a duration, determining a timespan of the TIR;

retrieving, from a calendar database and based on the determined timespan, one or more adjacent events to the TIR that are associated with the user, the one or more adjacent events having no conflict with the TIR when locations are disregarded, wherein a first location for a first adjacent event of the one or more adjacent events is retrieved from a map database, the first location being geographically distinct from the specified location;

calculating, based on data from one or more travel databases, a plurality of potential travel routes between the specified location and the first location;

determining, from a plurality of transportation modes used in a plurality of completed travel routes included in a transportation history of the user, a primary transportation mode of the user that is specific to traveling between the specified location and the first location;

comparing the plurality of potential travel routes with one or more history databases to calculate a first probable travel route of the plurality of potential travel routes, wherein calculating the first probable travel route comprises identifying one potential travel route of the plurality of potential travel routes that uses the primary transportation mode of the user; and subsequent to identifying an actual conflict between the TIR and the first adjacent calendar events when the first probable travel route adopted to travel between the specified location and the first location, automatically denying the TIR, in which case the overall 4D trajectory is not updated to include the TIR.

* * * * *

UNITED STATES PATENT AND TRADEMARK OFFICE
CERTIFICATE OF CORRECTION

PATENT NO. : 10,036,647 B2
APPLICATION NO. : 14/556741
DATED : July 31, 2018
INVENTOR(S) : Nima Barraci et al.

Page 1 of 1

It is certified that error appears in the above-identified patent and that said Letters Patent is hereby corrected as shown below:

On the Title Page

Item (72), in Column 1, in "Inventors", Line 3, delete "Wintergrasse (DE)" and insert -- Wintergasse (DE) --, therefor.

Signed and Sealed this
Ninth Day of April, 2019

Andrei Iancu
*Director of the United States Patent and Trademark Office*